(12) United States Patent
MacDonald et al.

(10) Patent No.: US 6,763,154 B2
(45) Date of Patent: Jul. 13, 2004

(54) METHODS AND STRUCTURES FOR THE CONTROL OF OPTICAL WAVEGUIDE DEVICES BY STRESS

(75) Inventors: Robert I. MacDonald, Manotick (CA); Barrie Keyworth, Ottawa (CA); Alan J. P. Hnatiw, Stittsville (CA)

(73) Assignee: JDS Uniphase Inc., Ottawa (CA)

( * ) Notice: Subject to any disclaimer, the term of this patent is extended or adjusted under 35 U.S.C. 154(b) by 75 days.

(21) Appl. No.: 10/150,060

(22) Filed: May 20, 2002

(65) Prior Publication Data

US 2002/0172447 A1 Nov. 21, 2002

Related U.S. Application Data

(60) Provisional application No. 60/291,987, filed on May 21, 2001.

(51) Int. Cl.[7] ........................... G02F 1/025; G02B 6/126
(52) U.S. Cl. ................... 385/13; 385/3; 385/11
(58) Field of Search ............................ 385/8, 9, 11, 13, 385/16, 27, 31, 39, 40, 49, 130–131, 3

(56) References Cited

U.S. PATENT DOCUMENTS

| | | | |
|---|---|---|---|
| 5,881,199 A | 3/1999 | Li ........................... 385/140 |
| 6,393,173 B1 * | 5/2002 | Doerr et al. ................... 385/16 |
| 2002/0090163 A1 * | 7/2002 | Lim et al. ...................... 385/15 |

OTHER PUBLICATIONS

Tabib–Azar et al., "Modern Trends in Mkrostructures and integrated optics for communication, sensing, and actuation", Opt. Eng. 36(5), pp. 1307–1318 (May 1997), 1997 Society of Photo–optical Instrumentation Engineers.*
"Silicon–Based Optoelectronics" Soref et al. Proceedings to the IEEE, vol. 81, No. Dec. 1993, pp. 16871706.

"Modern Trends in Microstructures and integrated optics for communication, sensing, and actuation" Tabib–Azar et al. Opt. Eng. 36(5) 1307–1318 (May 1997) 1997 Society of Photo–Optical Instrumentation Engineers.

"Theoretical Analaysis of Deformed Optical waveguides used in pressure and displacement sensors" Wu et al. Opt. Eng. 35(3) 870–881 (Mar. 1996) 1996 Society of Photo–Optical Instrumentation Engineers.

"Birefringence Control of Silica Waveguides on Si and Its Application to a Polarization–Beam Splitter/Switch " Okuno et al. Journal of Lightwave Technology, vol. 12, No. 4, Apr. 1994, pp. 625–628.

"Birefringence Free Planar Optical Waveguide Made by Flame Hydrolysis Deposition (FHD) Through Tailoring of the Overcladding".

Killian et al. Journal of Lightwave Technology, vol. 18, No. 2, Feb. 2000 pp. 193–198.

"Guided–Wave Intensity Modulators Using Amplitude–and–Phase Pertubations" Soref et al. Journal of Lightwave Technology, vol. 6, No. 3, Mar. 1988 pp. 437–444.

* cited by examiner

Primary Examiner—Hemang Sanghavi
Assistant Examiner—Omar Rojas
(74) Attorney, Agent, or Firm—Teitelbaum & MacLean; Neil Teitelbaum

(57) ABSTRACT

The invention provides polarization state changer and a phase shifter for shifting a phase of an optical signal including a waveguide having a waveguiding region for guiding the optical signal therethrough, a substrate for supporting said waveguide, and means for inducing stress on the waveguiding region for shifting the phase of the optical signal. The stress is induced by MEMS means. The MEMS means are monolithically formed on the substrate and can be actuated by electrostatical force, mechanical force, or tiltable flaps.

9 Claims, 7 Drawing Sheets

METHODS AND STRUCTURES FOR THE CONTROL OF OPTICAL WAVEGUIDE DEVICES BY STRESS

CROSS-REFERENCE TO RELATED APPLICATIONS

This applications claims priority of U.S. Provisional Application Serial No. 60/291,987 filed on May 21, 2001, entitled "Hybrid MEMS/Waveguide Structure For Stress Induced Phase Shifters" which is incorporated herein by reference for all purposes.

MICROFICHE APPENDIX

Not Applicable.

FIELD OF THE INVENTION

The present invention generally relates to the field of integrated optical waveguide devices controlled through optical phase, and in particular to hybrid MEMS/waveguide structures for phase shifting or polarization state changing.

BACKGROUND OF THE INVENTION

A technology referred to as micro-machining and micro-electromechanics has emerged relatively recently as a result of advances in semiconductor technology, especially in the field of semiconductor processing. Micro-electromechanical devices are complex structures which individually include one or more electrical systems and one or more micromechanical systems. Micro-electromechanical systems (MEMS) are fabricated with MEM devices using many of the same fabrication techniques that have miniaturized electronic circuits and made mass production of silicon integrated circuit chips possible. Micro-electromechanical systems are typically made of silicon, polysilicon, silicon nitride and silicon dioxide on silicon wafers. Micro-electromechanical systems used with optical elements to provide optical functions are termed Micro-opto-electromechanical systems (MOEMS).

More specifically, utilizing fabrication techniques such as wet etching and photolithography, basic structures like grooves, holes, trenches, hemispheres, cantilevers, gears, and shafts, etc., can be built upon or within a silicon wafer. From these basic structures, a wide variety of micromechanical devices can be constructed. For example, among the numerous micro-electromechanical systems that have been successfully implemented are valves, springs, nozzles, printer heads, accelerometers, and chemical sensors. More complex devices, such as gas chromatographs, can be fabricated upon a silicon wafer a few centimeters in diameter.

Integrated waveguide technology is making major inroads as the technology of choice for many advanced optical applications due to the possibility of integrating many optical functions in a single device with good performance and reliability, scalable manufacturing, and potentially lower cost. However, this progress has been mainly in the area of fixed or "passive" applications where optical routing is fixed by a property of the light, often the wavelength, and only the temperature of the optical circuit is controlled. At present, most prior art waveguide devices being used for dynamic and reconfigurable applications use optical phase shift to effect control and thermo-optic phase shifters as the controlling element. The most notable exceptions are those made in semiconductor materials, where carrier injection can be used, and lithium niobate ($LiNbO_3$), which has a high electro-optic coefficient allowing direct control by means of an electric field.

For thermo-optic or carrier injection devices the drive power required to achieve the phase shift is quite high (>100 mW per element) and lithium niobate devices involve a costly material that is thermally unstable because of the pyroelectric effect. These are both severe impediments for use in integrated, high channel count applications.

For emerging applications, such as dynamic gain equalizers and configurable optical add/drops, a technology is required that combines the low propagation losses required for large area DWDM devices and low drive power actuators that can be fabricated in arrays without a significant increase in the size of the chip. The present invention can provide a new type of structure that meets these criteria by combining established waveguide technology with MEMS-based electrostatic actuators that require little drive power.

A well-known prior art device in this field consists of a waveguide/MEMS structure where a cantilevered beam supporting a waveguide is offset by bending the beam in order to introduce losses. This structure is used for amplitude modulation rather than phase modulation and has the disadvantage that the light has to propagate through an air gap which would have to be AR (anti-reflection) coated. It has also been proposed to use the refractive index modulation due to the strain induced by electrostatically deflecting a cantilever containing a waveguide, to control an optical interferometer. However, in the interferometers considered, birefringence arising from the strain has not been used. Thus, it is desirable to use the birefringence induced by stress.

SUMMARY OF THE INVENTION

In accordance with the invention there is provided a controllable waveguide structure that combines waveguide and MEMS processing to produce electrostatically actuated, torsional stress-inducing phase shifters.

In accordance with the invention there is provided a controllable waveguide structure that combines waveguide and MEMS processing to produce electrostatically actuated, beam deflection stress-inducing birefringence shifters.

In accordance with the invention, there is further provided, a phase shifter for shifting a phase of an optical signal comprising a waveguide having a waveguiding region for guiding the optical signal therethrough; a substrate for supporting said waveguide; and means for inducing stress on the waveguiding region for shifting the phase of the optical signal. In accordance with an embodiment of the invention, the means for inducing stress are MEMS means.

In accordance with the invention, there is further provided, a polarisation state modifier for changing a polarization state of an optical signal comprising a waveguide having a waveguiding region for guiding the optical signal therethrough; a substrate for supporting said waveguide; and means for inducing stress on the waveguiding region for changing the polarization state of the optical signal. In accordance with an embodiment of the invention, the means for inducing stress are MEMS means.

In accordance with another aspect of the invention, there is provided, a method of inducing a phase shift of an optical signal propagating through an optical waveguide relative to the phase of another optical signal, comprising the steps of: supporting said optical waveguide on a substrate; providing MEMS means on said substrate; and inducing stress on the optical waveguide using the MEMS means for changing a refractive index of the waveguide and thereby shifting the phase of the optical signal propagating through said optical waveguide.

In accordance with another aspect of the invention, there is provided, a method of inducing a shift of the polarisation state of an optical signal propagating through an optical waveguide, comprising the steps of supporting said optical waveguide on a substrate; providing MEMS means on said substrate; and inducing stress on the optical waveguide using the MEMS means for changing a birefringence of the waveguide and thereby changing the polarization state of the optical signal propagating through said optical waveguide.

In accordance with the invention there is further provided an integrated micro-opto-mechanical system comprising a waveguide; a substrate for supporting said waveguide; and MEMS means for inducing stress on said waveguide for changing a refractive index of said waveguide, and an optical waveguide device influenced by the refractive index of said waveguide.

In accordance with the invention there is provided an integrated micro-opto-mechanical system comprising a waveguide, a substrate for supporting said waveguide and MEMS means for inducing stress on said waveguide for changing a birefringence of said waveguide, and an optical waveguide device influenced by birefringence of said waveguide.

The invention further provides a method for making a controllable waveguide structure that combines waveguide and MEMS processing for producing stress-induced changes of refractive index for phase shifting.

In accordance with the invention the MEMS means for inducing stress generates compressive stress in the waveguide.

In accordance with the invention the MEMS means for inducing stress generates tensile stress in the waveguide.

In accordance with the invention the MEMS means for inducing stress generates shear stress in the waveguide.

In accordance with an embodiment of the present invention a deformable membrane with a waveguide bridge crossing over top is provided with electrostatic actuation means to induce stress by deflecting the waveguide bridge to generate a change in the birefringence of the waveguide.

In accordance with an embodiment of the present invention a deformable membrane with a waveguide bridge crossing over top is provided with electrostatic actuation means to induce stress by twisting the waveguide bridge to generate a change in the refractive index or birefringence of the waveguide.

In accordance with an embodiment of the present invention, the birefringence is compensated for by using a reflective structure with a quarter wave plate to have opposite polarization states on forward and reverse passes to cancel the birefringence.

In accordance with the invention the waveguide is disposed asymmetrically in the cross section of the stressed member.

In accordance with the invention the waveguide is laterally displaced from an axis of symmetry of the stressed member.

In accordance with an embodiment of the present invention, mechanical stress is applied to a waveguide to generate strain which results in refractive index changes due to the elasto-optic effect.

In accordance with an embodiment of the present invention, mechanical stress is applied to a waveguide by electrostatic means.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE INVENTION

Silica waveguides on silicon substrates are an excellent candidate for waveguide/MEMS hybrid devices since they offer excellent waveguide properties and compatibility with bulk and/or surface micro-machining. In the following examples are presented of possible configurations for these devices.

Figure 1:
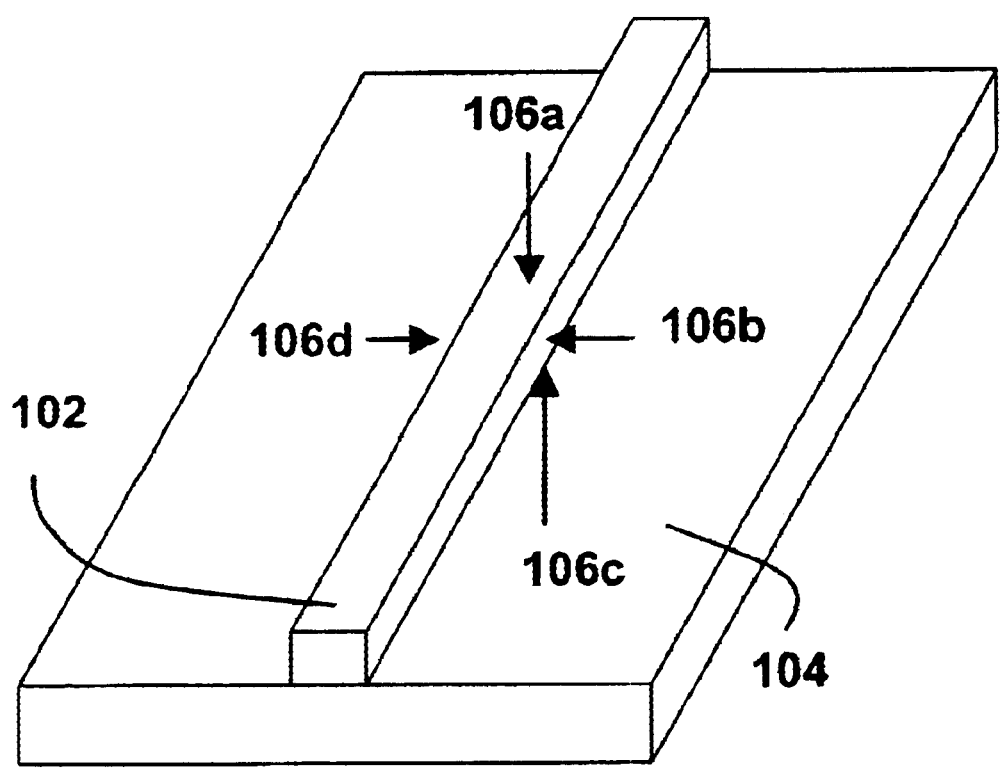
FIG. 1 shows a perspective view of a waveguide deposited on a substrate.

FIG. 1 shows a perspective view of a waveguide 102 deposited on a substrate 104. Arrows 106a–d are presented to indicate an induced stress on the waveguide 102. Mechanical strain produces optical path length changes in dielectric waveguides by the elasto-optic effect and by length changes in the waveguide itself. The strain produces changes in the refractive index for both $T_E$ and $T_M$ polarization modes. If the applied stress causes approximately a same change of the refractive index in both $T_E$ and $T_M$ polarization states, a polarization independent device is produced. However, if the applied stress causes different changes in refractive index for the $T_E$ and $T_M$ polarization states, birefringence is created. The performance of some configurations of these optical devices is considerably polarization dependent in the presence of birefringence.

In accordance with the present invention applications are presented below for the control of optical devices by means of both types of stress induced refractive index change. In the case of a polarization independent change of refractive index, a phase shift of an optical signal propagating through the waveguide is created which can be used, for example, in a Mach-Zehnder configuration. If birefringence is created, it can be used advantageously in a Sagnac loop configuration, for example.

Figure 2A:
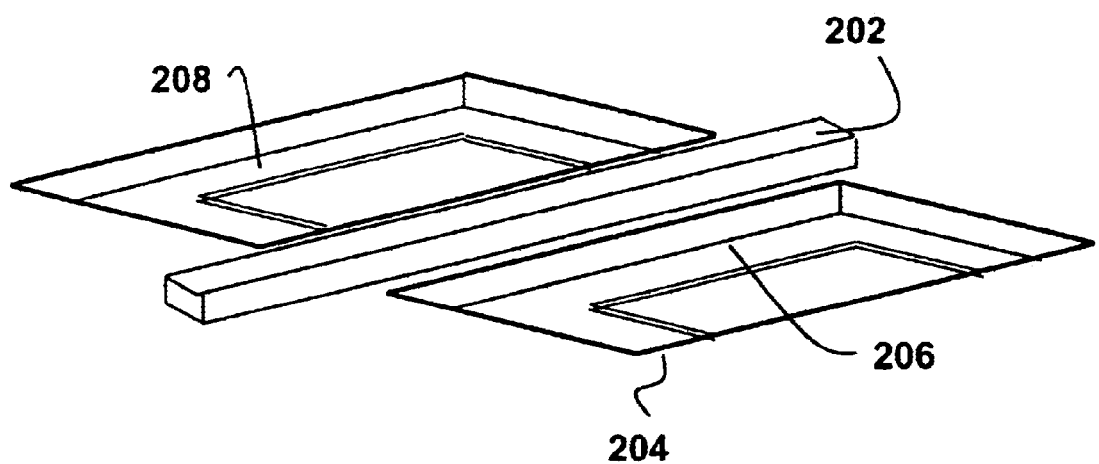
FIG. 2a shows a perspective view of another waveguide deposited on a waveguide bridge extending across a substrate hole.

FIG. 2a shows a perspective view of another waveguide deposited on a substrate 204. However, in this configuration, the waveguide 202 is deposited on a silica bridge 206 which extends across a substrate hole 208. For example, a simple optical switch of this type using a cantilever beam actuator on the path of a waveguide is presented in an article by M. Tabib-Azar and G. Beheim entitled "Modern trends in microstructures and integrated optics for communication, sensing, and actuation" published in the Journal of Opt. Eng. 36(5) 1307–1318 (May 1997). Furthermore, a Mach-Zehnder interferometer is disclosed in an article by M. J. Wu and M. Tabib-Azar entitled "Theoretical analysis of deformed optical waveguides used in pressure and displacement sensors" published in the Journal of Opt. Eng. 35(3) 870–881 (March 1996). One of the interferometer arms is placed over a diaphragm that is deformable upon mechanical perturbation, such as force or pressure. This causes an elongation of the waveguide and a change in its refractive index, and a phase difference develops between light travelling in the deformable and reference arms.

Figure 2B:
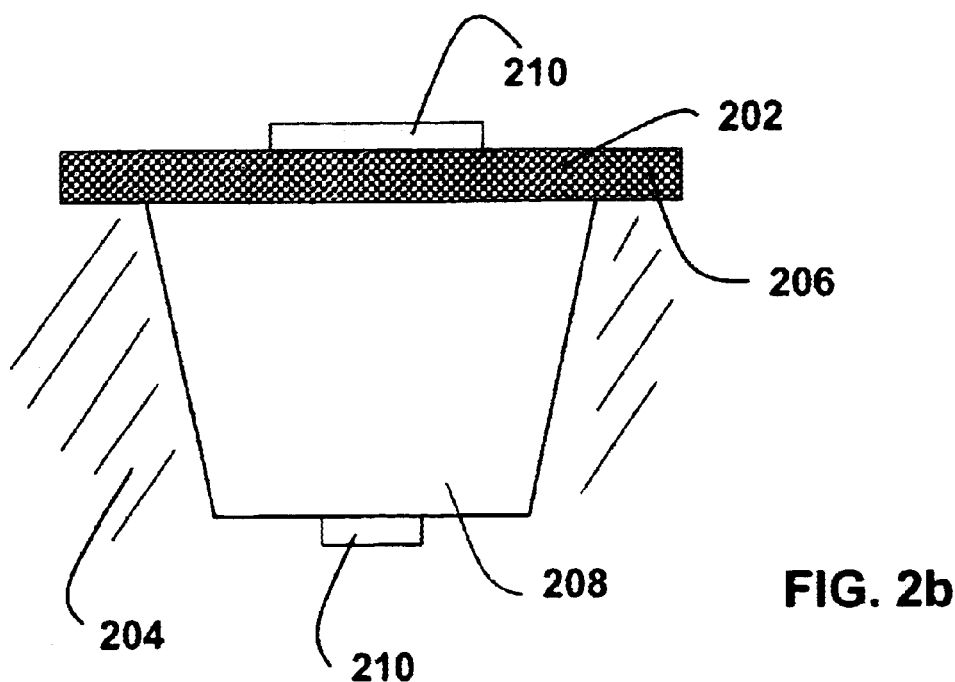
FIG. 2b shows a longitudinal cross section of the waveguide bridge shown in FIG. 2a with the hole and the electrodes that actuate the waveguide bridge to generate stress-induced birefringence in the waveguide according to the invention.
Figure 2C:
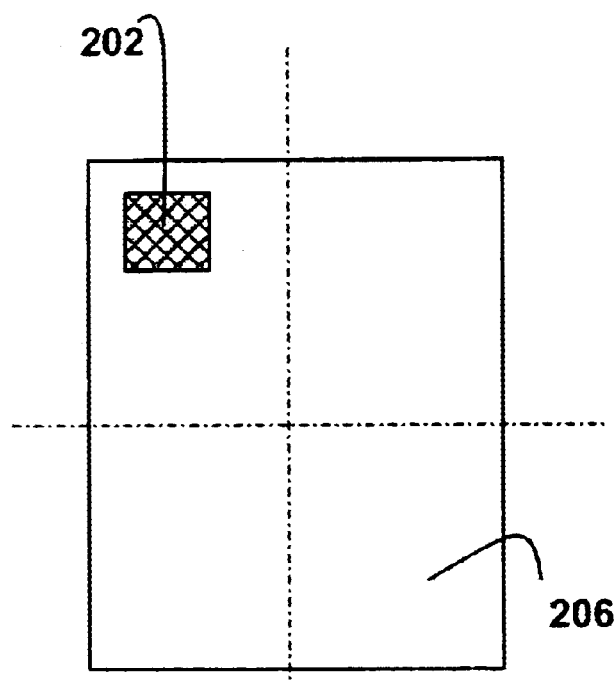
FIG. 2c shows a transverse cross section of the waveguide bridge showing the asymmetric placement of the waveguide in the mechanical structure.

FIG. 2b shows a longitudinal cross-section of the bridge showing the hole and the electrodes 210 that deflect the bridge to cause strain. FIG. 2c shows the asymmetric placement of the waveguide 202 in the bridge 206 to optimize a relation between compressive and tensile forces when a strain is exerted on the waveguide 202 and therefore the birefringence induced in the waveguide by stress. The waveguide can either be integral with the substrate or it can be placed on top of the substrate.

Figure 3A:
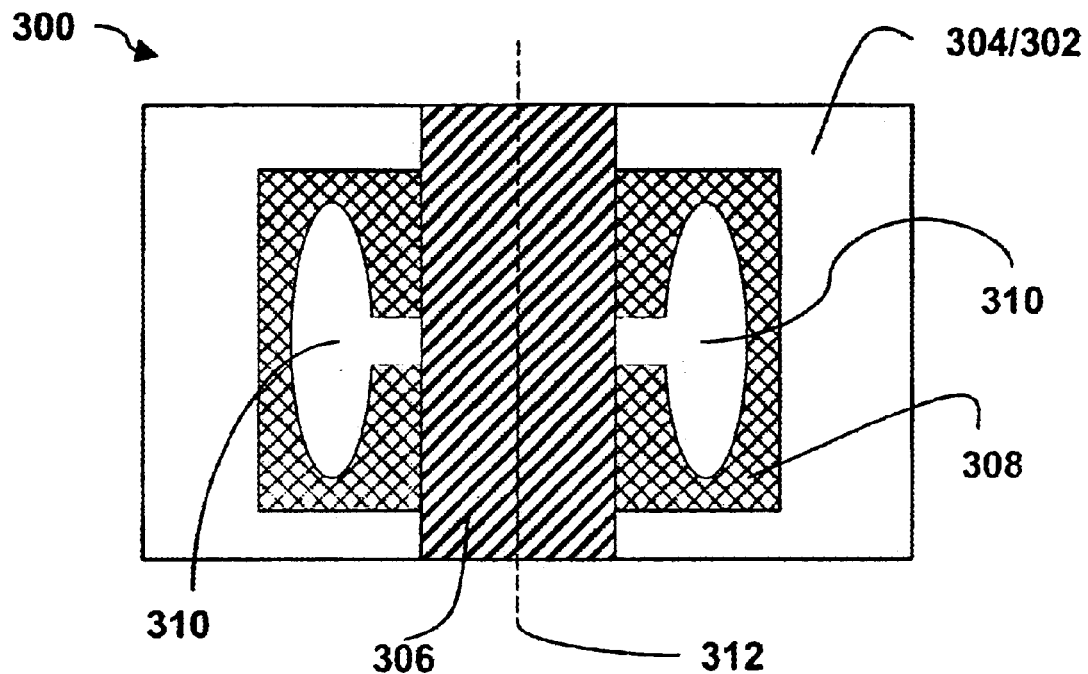
FIG. 3a shows a schematic view of a waveguide structure in accordance with the invention that generates stress by torsion.

FIG. 3a shows a MEMS device 300 that includes a waveguide bridge and a tiltable flap 310 with the waveguide bridge forming at least part of a torsional hinge or axis of rotation 312 attached to the flap 310. By applying a voltage to an electrode in association with the tiltable flap 310, electrostatic force is applied to it. This force is transmitted to the axis of rotation 312, applying a torsion to the waveguide 306.

Figure 3B:
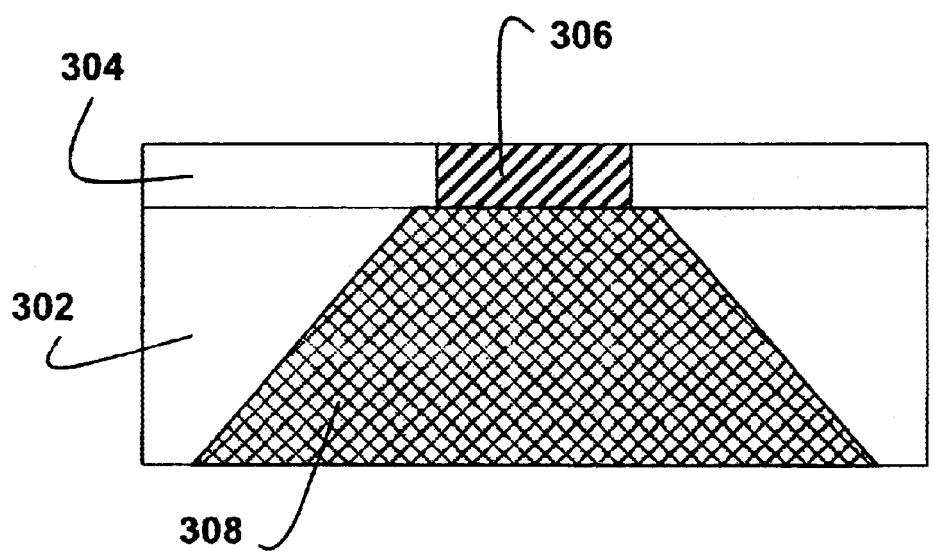
FIG. 3b shows a cross section of the waveguide structure shown in FIG. 3a showing the hole and the electrodes that apply torsional force to the waveguide structure.

FIG. 3b shows a schematic cross-sectional view of a substrate 302 on which a membrane 304 is created. A waveguide 306 is disposed within the membrane 304. Together, the membrane 304 and the waveguide 306 form the waveguide bridge. Part of the substrate 302 is removed by etching below the waveguide 306 to create a hole/well 308 below the waveguide 306. The flaps 310 are freestanding and created by removing a part of the membrane 304. The flaps 310 are moved so as to create a twisting force on the waveguide 306 and hence a torsional stress by providing electrodes, for example, and applying a voltage to these electrodes.

Figure 3C:
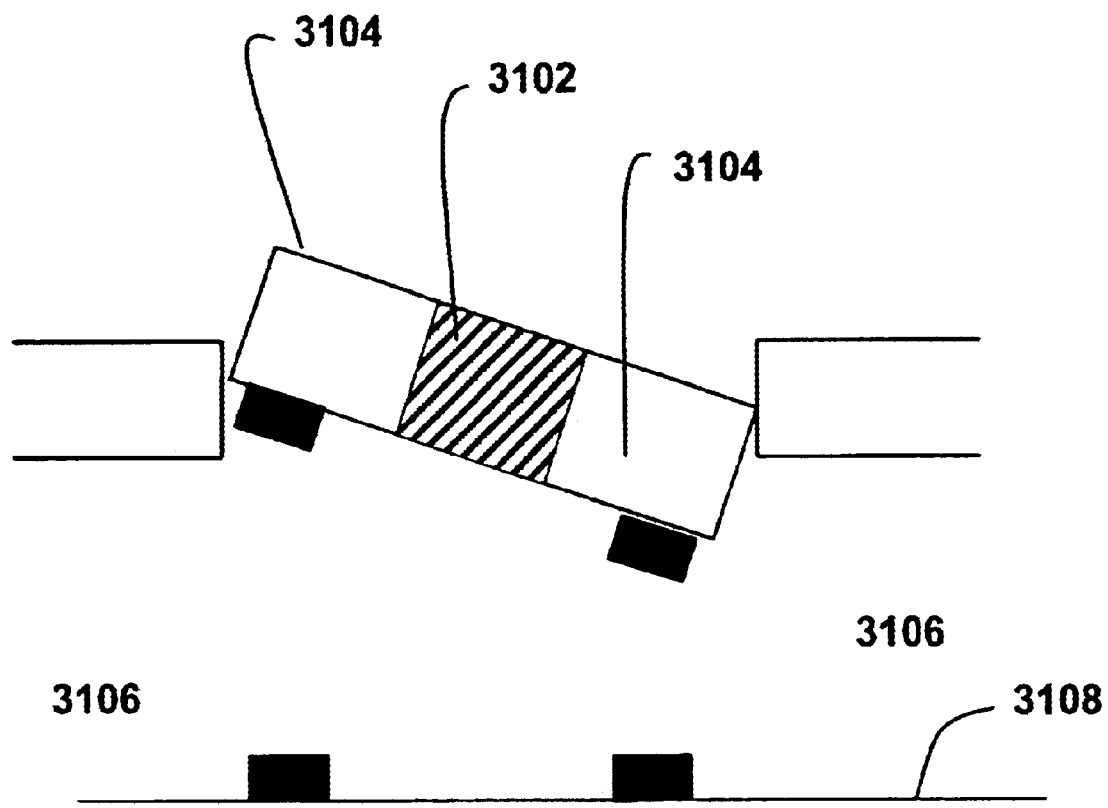
FIG. 3c shows a schematic view of how the flaps are activated to create a torsional stress in the waveguide by providing electrodes at the bottom of the hole and at the bottom of the flaps at respectively opposing sides.

FIG. 3c shows how the flaps are activated to create a torsional stress in the waveguide. Electrodes 3106 are provided at the bottom of a well 3108 and at the bottom of flaps 3104 at respectively opposing sides so that when a voltage is applied to one side or another of these electrodes so that the flaps 3104 are pulled down and thereby twisting waveguide 3102. Alternatively, in accordance with another embodiment, the flaps 3104 are pushed up by using magnetic or electromagnetic forces. This kind of activation of the flaps is similar to an activation of MEMS tiltable mirrors.

A problem may occur in creating a relatively large change in the desired waveguide property if the cross section of the waveguide bridge structure is symmetric. An induced change in refractive index or birefringence may vary from positive to negative along the length of the waveguide, resulting in a net zero effect. This can be overcome by modifying the structure to break the symmetry. In accordance with another embodiment of the present invention the waveguide core (waveguiding region) is offset from the center of the bridge cross-section. The offset may be a constant amount or may vary along the length of the bridge.

Figure 4A:
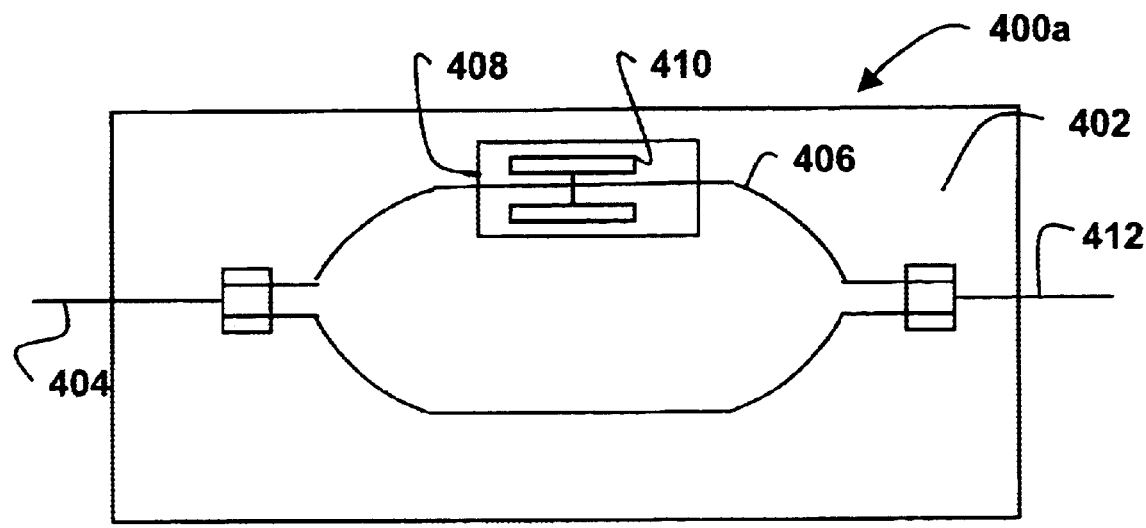
FIG. 4a shows a schematic top view of an optical switch having a Mach-Zehnder configuration with one output port, actuated by a phase shifter in accordance with the present invention.

FIG. 4a shows a schematic top view of a torsional phase shifter 400a in accordance with the present invention used to control a Mach-Zehnder interferometer. This Mach-Zehnder-type phase shifter 400a is disposed on a substrate 402. An input waveguide 404 is shown on the left of the device. A phase shift is created in one arm of the Mach-Zehnder interferometer by applying stress on arm 406. In order to create torsional stress on arm 406, the waveguide arm 406 is suspended over a well 408 and a torsional stress is generated by applying electrostatic force to flap 410. The embodiment in FIG. 4a is shown with a single output port 412 so that the phase shifter can be used in an on/off-mode, i.e. in one mode of operation the signal is transmitted and in another mode of operation the signal passing through device 400a is attenuated by interference in the interferometer. A similar Mach-Zehnder interferometer controlled by torsional stress can also be used as an optical routing switch.

Figure 4B:
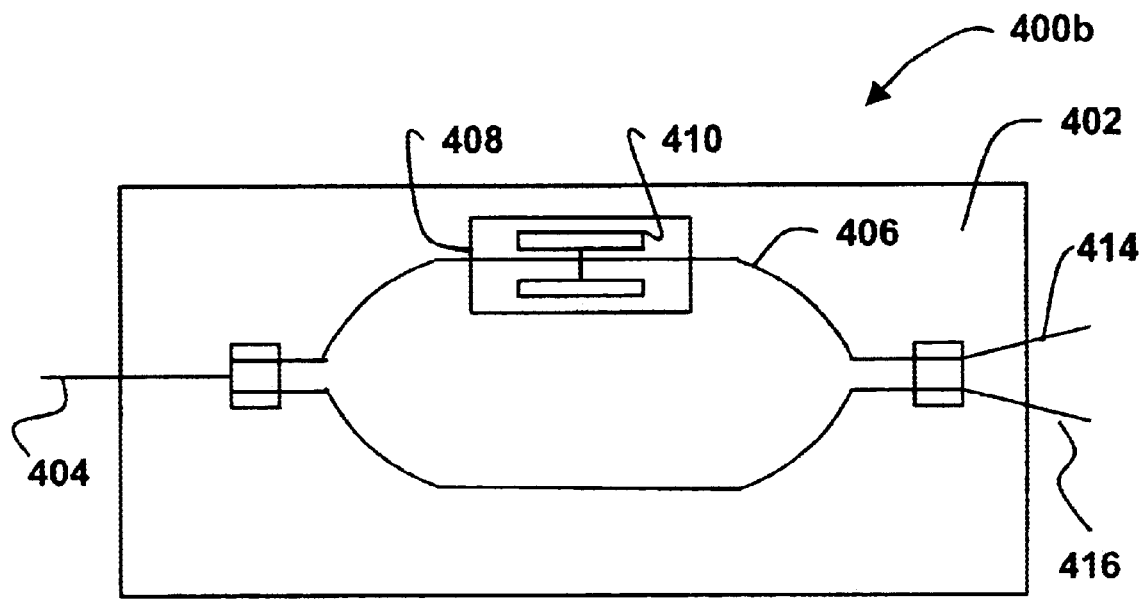
FIG. 4b shows a schematic top view of another optical switch having a Mach-Zehnder configuration with two output ports, actuated by a phase shifter in accordance with the present invention.

FIG. 4b shows a schematic top view of another phase shifter 400b in accordance with the present invention controlling a Mach-Zehnder interferometer but with two output ports 414 and 416. The operation of device 400b is similar to device 400a except that that phase shift in this device is used to switch the input signal between the two output ports.

Figure 5:
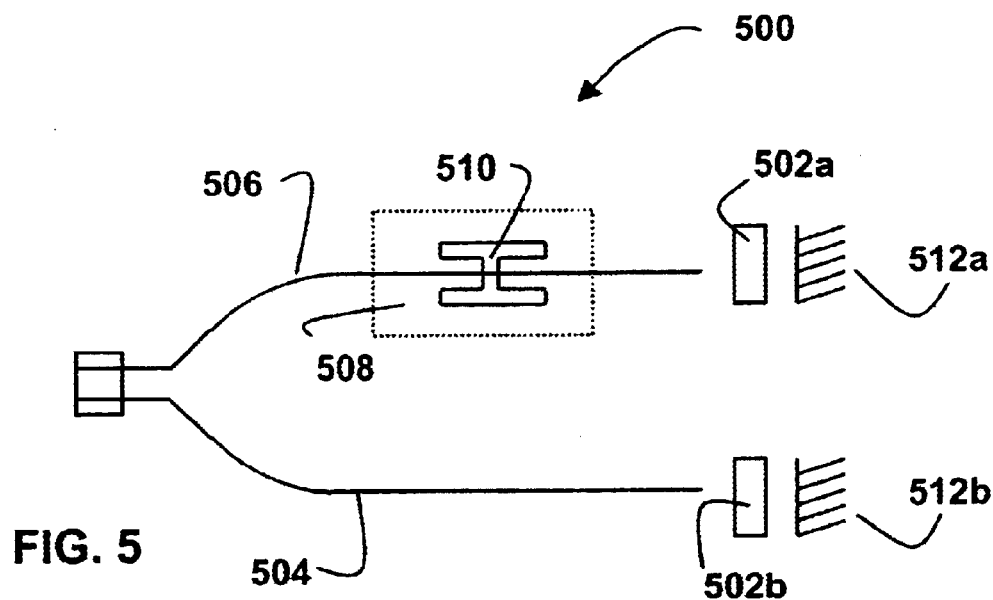
FIG. 5 shows a schematic view of a reflective Mach-Zehnder switch making operational use of an index shift with a quarter waveplate for eliminating the effect of birefringence.

FIG. 5 shows a schematic view of a reflective Mach-Zehnder switch 500 making operational use of an index shift with a quarter waveplate 502a and 502b for eliminating the effect of birefringence. The Mach-Zehnder switch 500 includes a reference arm 504 and a deformable arm 506 disposed over a well 508. A torsional stress is induced on the deformable arm 506 by flaps 510. In accordance with this embodiment of the invention, the birefringence is compensated for by using mirrors 512a and 512b in a reflective design with quarter waveplates 502a and 502b to have opposite polarization states on forward and reverse passes to cancel the birefringence.

The invention is not intended to be limited to the embodiments described above and other configurations can be employed to induce a change in refractive index in a waveguide in a combination of a waveguide, such as a silica waveguide, formed using conventional processing with stress-induced phase shifters formed either monolithically or by hybrid integration on the waveguide substrate using MEMS processing. Advantageously, electrostatic actuation is used due to low power consumption and pseudo-latching, but other actuators, such as thermal actuators, can be used. MEMS latching mechanisms can be included to clamp the structure at a predetermined stress point.

The element in which the phase shift occurs can be an Arrayed Waveguide (AWG), a fiber attached to a waveguide, a multi-mode interference coupler, or an interferometer, such as a Mach-Zehnder interferometer.

The induced phase difference is proportional to the optical path difference between waveguide arms and inversely proportional to the wavelength.

The use of MEMS and integrated waveguide hybrid structures are compatible as similar substrate machining techniques are employed.

Alternatively, a mechanical force can be applied to stress the waveguide. However, it is advantageous to use an electrostatic activation since it consumes very little power to induce stresses as in comparison to thermo-optical devices.

Figure 6:
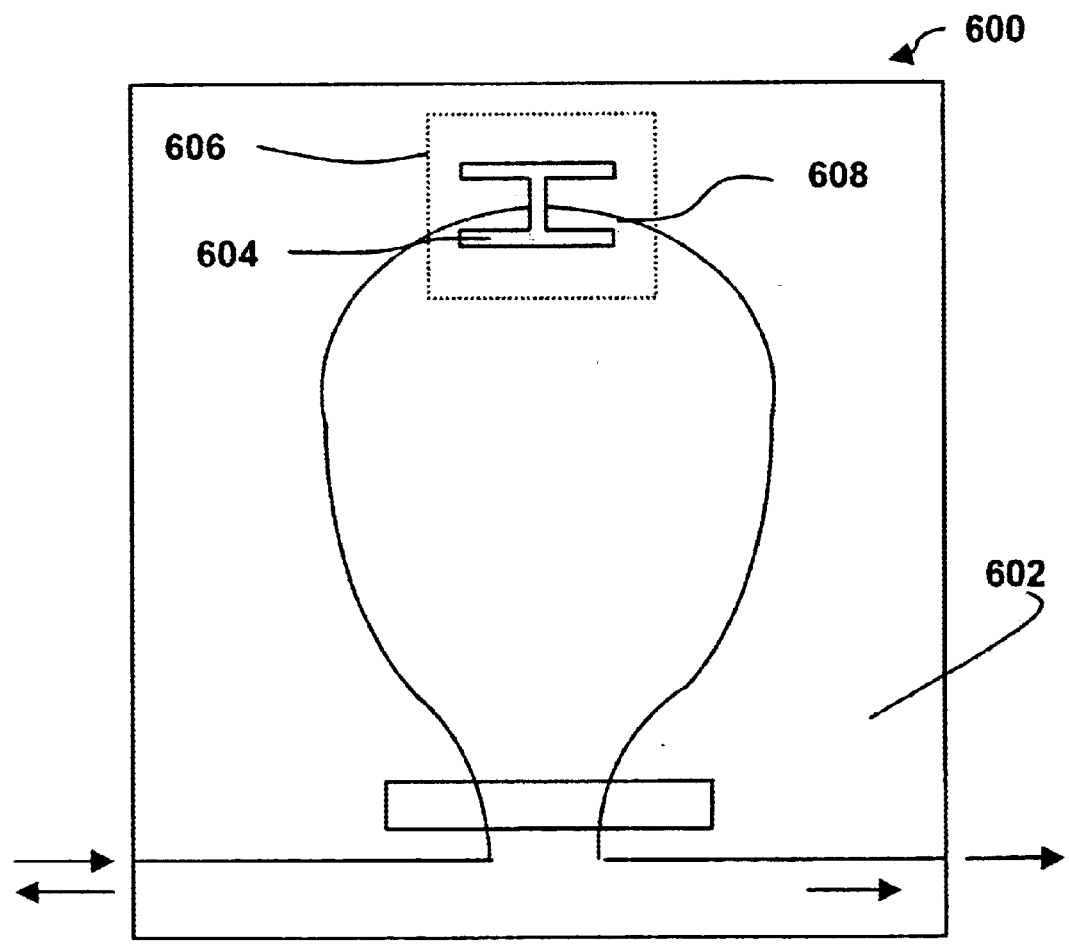
FIG. 6 shows a schematic top view of another optical switch having a Sagnac configuration, with two ports that serve both as inputs and outputs, actuated by a birefringence shifter in accordance with the present invention.

FIG. 6 shows a schematic top view of another device 600 in accordance with the present invention having a Sagnac loop configuration. The Sagnac interferometer is disposed on a substrate 602. A stress imposing device 604 designed to produce birefringence in the waveguide 608 is disposed in the loop and may be undesirable in some devices because it introduces polarisation dependence. In this Sagnac loop configuration, a birefringence can be used advantageously for control because it does not cause polarisation dependent operation.

An example of an application of devices in accordance with the present invention is a gain equalizer by using an Arrayed Waveguide (AWG) to demultiplex, controllably attenuate each wavelength by a stress controlled attenuator such as that shown in FIG. 3a, and then re-multiplex the attenuated signals in the AWG to obtain gain equalization in a fully integrated device.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An integrated MEMS/waveguide structure-comprising:
a waveguide having a waveguiding region for guiding an optical signal therethrough;
a substrate for supporting said waveguide; and
means for inducing stress on the waveguide for one of shifting a phase and modifying a polarization state of the optical signal, wherein the means for inducing stress are for one of providing torsional stress to induce a phase shift or change of polarization state and beam deflection stress to induce a change of polarization state of the optical signal, wherein the means for inducing stress are electrostatically actuated MEMS means, wherein the MEMS means are for changing a refractive index of said waveguide, and further comprising an optical waveguide device influenced by the refractive index of said waveguide for providing an integrated micro-opto-mechanical system and,
a well below the MEMS means.

2. The integrated MEMS/waveguide structure as defined in claim 1 further comprising a deformable membrane with a waveguide bridge crossing over the well for inducing stress by twisting the waveguide bridge to generate a change in the refractive index or birefringence of the waveguide.

3. An integrated MEMS/waveguide structure comprising:
a waveguide having a waveguiding region for guiding an optical signal therethrough;
a substrate for supporting said waveguide;
means for inducing stress on the waveguide for one of shifting a chase and modifying a polarization state of the optical signal, wherein the means for inducing stress are for one of providing torsional stress to induce a phase shift or change of polarization state and beam deflection stress to induce a change of polarization state of the optical signal, wherein the means for inducing stress are electrostatically actuated MEMS means, wherein the MEMS means are for changing a birefringence of said waveguide, and further comprising an optical waveguide device influenced by the birefringence of said waveguide for providing an integrated micro-opto-mechanical system; and,
further comprising a well below the MEMS means.

4. The integrated MEMS/waveguide structure as defined in claim 3 further comprising a deformable membrane with a waveguide bridge crossing over the well for inducing stress by deflecting the waveguide bridge to generate a change in the birefringence of the waveguide.

5. An integrated MEMS/waveguide structure comprising:
a waveguide having a waveguiding region for guiding an optical signal therethrough;
a substrate for supporting said waveguide;
means for inducing stress on the waveguide for one of shifting a phase and modifying a polarization state of the optical signal, wherein the means for inducing stress are for one of providing torsional stress to induce a phase shift or change of polarization state and beam deflection stress to induce a change of polarization state of the optical signal, wherein the means for inducing stress are electrostatically actuated MEMS means; and,
a well below the MEMS means.

6. The integrated MEMS/waveguide structure as defined in claim 5 wherein the waveguide is substantially asymmetrically disposed on a waveguide bridge.

7. The integrated MEMS/waveguide structure as defined in claim 5 wherein the waveguide is laterally displaced from an axis of symmetry upon a waveguide bridge.

8. The integrated MEMS/waveguide structure as defined in claim 5, wherein a mechanical stress is applied to the waveguide for generating a strain to yield a refractive index change due to an elasto-optic effect.

9. The integrated MEMS/waveguide structure as defined in claim 8 wherein the mechanical stress is applied by electrostatic means.

* * * * *

UNITED STATES PATENT AND TRADEMARK OFFICE
CERTIFICATE OF CORRECTION

PATENT NO. : 6,763,154 B2
DATED : July 13, 2004
INVENTOR(S) : MacDonald et al.

It is certified that error appears in the above-identified patent and that said Letters Patent is hereby corrected as shown below:

Column 8,
Line 6, "a chase and" should read -- a phase and --

Signed and Sealed this

Twenty-fourth Day of May, 2005

JON W. DUDAS
*Director of the United States Patent and Trademark Office*